US007203326B2

(12) United States Patent
Matsuzawa et al.

(10) Patent No.: US 7,203,326 B2
(45) Date of Patent: Apr. 10, 2007

(54) NOISE SUPPRESSING APPARATUS

(75) Inventors: Hitoshi Matsuzawa, Kawasaki (JP); Yasushi Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 742 days.

(21) Appl. No.: 10/113,636

(22) Filed: Mar. 27, 2002

(65) Prior Publication Data

US 2002/0150265 A1 Oct. 17, 2002

Related U.S. Application Data

(63) Continuation of application No. PCT/JP99/05370, filed on Sep. 30, 1999.

(51) Int. Cl.
*H04B 15/00* (2006.01)

(52) U.S. Cl. ..................... 381/94.2; 381/94.1; 381/123

(58) Field of Classification Search ............... 381/94.1, 381/94.2, 94.3, 98, 100, 101, 102, 103, 123, 381/94.5
See application file for complete search history.

(56) References Cited

U.S. PATENT DOCUMENTS 4,628,529 A * 12/1986 Borth et al. ............... 381/94.3
4,630,304 A * 12/1986 Borth et al. ............... 381/94.3
4,797,931 A * 1/1989 Furukawa et al. ............ 381/56
4,811,404 A * 3/1989 Vilmur et al. ............. 381/94.3
5,251,263 A * 10/1993 Andrea et al. ............. 381/71.6
5,544,250 A * 8/1996 Urbanski ................... 381/94.3
6,654,471 B1 * 11/2003 Varga ........................ 381/94.8

FOREIGN PATENT DOCUMENTS

| | | |
|---|---|---|
| JP | 04-340599 | 11/1992 |
| JP | 07-193548 | 7/1995 |
| JP | 07-306695 | 11/1995 |
| JP | 09-018291 | 1/1997 |
| JP | 09-074596 | 3/1997 |
| JP | 09-258768 | 10/1997 |
| JP | 10-003299 | 1/1998 |
| JP | 10-133689 | 5/1998 |
| JP | 11-038999 | 2/1999 |
| JP | 11-102197 | 4/1999 |
| JP | 11-154000 | 6/1999 |
| JP | 11-338499 | 12/1999 |
| WO | WO 96/24127 | 8/1996 |

* cited by examiner

*Primary Examiner*—Xu Mei
(74) *Attorney, Agent, or Firm*—Katten Muchin Roseman LLP

(57) ABSTRACT

In an apparatus which estimates characteristics of a surrounding noise only when an input signal is soundless and performs a noise reduction or suppression of the input signal based on the estimated result, a signal noise ratio is estimated from the input signal, and an automatic switch or an automatic adjustment is performed so as to execute a noise reduction only when the signal noise ratio is good, otherwise to avoid the noise reduction or make the noise reduction degree smaller.

4 Claims, 4 Drawing Sheets

NOISE SUPPRESSING APPARATUS

"This application is a continuation of international application number PCTJP99/05370, filed Sep. 30,1999"

BACKGROUND OF THE INVENTION

1. Field of the Invention

The present invention relates to a noise suppressing apparatus, and in particular to an apparatus which is used for transmitting, accumulating, encoding, and recognizing a voice (speech), detects a soundless section of an input signal including a surrounding noise (background noise) to estimate characteristics of the surrounding noise, performs a signal processing according to the estimated character, and reduces or suppresses a noise.

2. Description of the Related Art

In the prior art noise suppressing (reducing) apparatus, a spectrum subtraction method for reducing a surrounding noise or the like included in a collected voice signal to emphasize voice components has been adopted in application of a voice transmission or a voice recognition for a cellular phone.

In such a spectrum subtraction method, as disclosed in the Japanese Patent Application Laid-open Nos. 4-340599 and 7-306695, a sound presence/absence is determined, a soundless section (section with only a noise) is cut out, and the character of the voice is estimated by using a signal of the soundless section.

This will be described referring to the attached figures. A noise reduction device 1, as shown in FIG. 6, is composed of a sound presence/absence determiner 11 for determining a sound presence section and a sound absence section of an input signal, a noise spectrum estimating portion 12 for inputting the input signal and calculating an estimated noise spectrum according to a determined result by the sound presence/absence determiner 11, and a spectrum subtractor 13 for subtracting the estimated noise spectrum calculated at the noise spectrum estimating portion 12 from the input signal to output a signal in which a noise is suppressed.

Among these portions, the sound presence/absence determiner 11 compares a frame power nfpow of an input signal s1 with a threshold value thr_pow to obtain a determined value as the following equation:

$$\text{determined value} = \begin{cases} 0: & \text{sound absence } (nfpow < \text{thr\_pow}) \\ 1: & \text{sound presence } (nfpow \geq \text{thr\_pow}) \end{cases} \quad \text{Eq. (1)}$$

Also, the noise spectrum estimating portion 12 executes the operation shown in FIG. 7 in accordance with the determined value from the sound presence/absence determiner 11 indicated by the above Eq.(1).

In FIG. 7, the estimated noise spectrum is not calculated if the determined result of the sound presence/absence determiner 11 indicates "sound presence", so that the estimated noise spectrum calculated by the preceding frames is used. Only when it is recognized that the determined result of the sound presence/absence determiner 11 indicates "sound absence" (at step S11), an input signal transformation to a frequency range is performed (at step S12) having f1 [w] and f2 [w] respectively for a real part of the spectrum and an imaginary part by an FFT (Fast Fourier Transform) calculation of an NT point. It is to be noted that "w" is supposed to be a variable indicating a frequency.

As a result, a spectrum amplitude f3 [ ] of the input signal is given by the following equation:

$$f3[w]=\sqrt{f1[w]*f1[w]+f2[w]*f2[w]} \quad \text{Eq.(2)}$$

A noise estimation buffer f3buf [ ] [ ] (supposed to perform f3num frame accumulation) is updated as given by the following equation (at step S13):

$$\left.\begin{aligned} f3buf[frm][w] &= f3buf[frm-1][w] \\ f3buf[1][w] &= f3[w] \end{aligned}\right\} \quad \text{Eq. (3)}$$

Then, the above-mentioned noise estimation buffer is averaged to obtain an estimated noise spectrum f3est [w] as given by the following equation:

$$f3est[w] = \frac{1}{f3num}\sum_{frm=1}^{f3num} f3buf[k][w] \quad \text{Eq. (4)}$$

The estimated noise spectrum f3est [w] thus obtained is provided to the spectrum subtractor 13 together with the input signal, for the spectrum subtraction.

The arrangement of the spectrum subtractor 13 is shown in FIG. 8, in which the input signal is converted into a signal of the frequency range at an FFT calculator 111, and the real part of the spectrum f1 [w], the imaginary part f2 [w], and the spectrum amplitude f3 [w] are obtained as described above.

The estimated noise spectrum f3est [w] given by the above-mentioned Eq.(4) is provided to a subtractor 112 to perform the subtraction.

At the subtractor 112, a noise reducing coefficient g1 [w] is firstly obtained by the following equation:

$$g1[w] = \sqrt{\frac{\text{MAX}(0.0,\ f3[w]*f3[w] - f3est[w]*f3est[w])}{f3[w]*f3[w]}} \quad \text{Eq. (5)}$$

This coefficient is obtained by normalizing a difference (0 or more) between the power of the spectrum amplitude f3 [w] and the power of the estimated noise spectrum f3est [w] with the power of the spectrum amplitude f3 [w].

By using this coefficient g1, a real part f4 [w] and an imaginary part f5 [w] of the spectrum after the subtraction at the subtractor 112 will be calculated as given by the following equations:

$$\left.\begin{aligned} f4[w] &= f1[w]*g1[w] \\ f5[w] &= f2[w]*g1[w] \end{aligned}\right\} \quad \text{Eq. (6)}$$

An inverse FFT (Inverse Fast Fourier Transform) is performed to the real part f4 [w] and the imaginary part f5 [w] of the spectrum outputted from the subtractor 112 at a calculator 113, and then a signal (after noise reduction) s2 [n] is outputted In addition to an embodiment of a noise reduction processing in a frequency range as mentioned above, it is also made possible in a time range. For example, the input signal is divided into a plurality of bandwidths by a bandwidth division filter and an estimated noise power for each bandwidth is obtained, whereby a suppressing processing has only to be performed so that the power may have the estimated noise power subtracted from the input power for each bandwidth at the spectrum subtraction.

In such a prior art noise reduction device, it is disadvantageous that the sound presence/absence can not be accurately determined when a signal noise ratio (SNR) is extremely bad, so that a spectrum estimation is performed in the sound presence section, thereby suppressing sound components.

In the Japanese Patent Application Laid-open No. 9-18291, such a technology is disclosed that the signal noise ratio is estimated, and an adaptive rate (step size) of an adaptive filter is controlled by the estimated value, thereby suppressing the noise.

However, in this Japanese Patent Application Laid-open No. 9-18291, it is disadvantageous that a single microphone is provided respectively for the input signal and a reference noise for controlling the adaptive filter, and two microphones in total are required, so that the hardware is enlarged and the cost is high.

SUMMARY OF THE INVENTION

It is accordingly an object of the present invention to provide a noise reducing or suppressing apparatus which detects a soundless section by using an input signal including a surrounding (ambient) noise, estimates characteristics of the surrounding noise, and performs a signal processing according to the estimated character, wherein effective noise suppression with less hardware is realized.

In order to achieve the above-mentioned object, a noise suppressing apparatus according to the present invention comprises: a noise reduction device for estimating a spectrum of a surrounding noise only when an input signal is soundless and for performing a spectrum subtraction of the input signal based on the estimated noise spectrum, a noise reduction execution determiner for estimating a signal noise ratio from the input signal and for determining whether or not the signal noise ratio is equal to or more than a threshold value, and a switch portion for selecting an output signal of the noise reduction device based on an output signal of the noise reduction execution determiner only when the signal noise ratio is equal to or more than the threshold value and for selecting the input signal otherwise.

Namely, in the present invention, a noise reduction device as shown in FIG. 6 is used, and a switch portion selects either an output signal of the noise reduction device or an input signal as it is, based on the determined result as to whether or not a signal noise ratio estimated from the input signal is equal to or more than a threshold value.

Accordingly, only when the signal noise ratio of the estimated input signal is equal to or more than the threshold value, the noise reduction execution determiner switches over the switching portion to the side of the noise reduction device to output the signal after the noise reduction, and otherwise makes the input signal as it is, the output signal.

As a result, while in a pure voice the difference between powers of a sound presence portion and a sound absence portion is large and so the difference between the maximum value and the minimum value of the powers is large, in many cases of surrounding noise, the power variation is small, so that the difference is small. Therefore, there is a tendency that the power difference becomes small in case the signal noise ratio is bad, that is the estimation of the noise section is difficult, so that the noise reduction is stopped.

Also, in the noise suppressing apparatus according to the present invention, for achieving the above-mentioned object, it is possible to provide a noise reduction device for estimating a spectrum of a surrounding noise only when an input signal is soundless and for performing a spectrum subtraction of the input signal based on the estimated noise spectrum, and a reduction intensity calculator for calculating a noise reduction intensity from a power of the input signal to be multiplied to the estimated noise spectrum.

Namely, a reduction intensity calculator calculates a noise reduction intensity upon subtracting the estimated noise spectrum estimated at the noise spectrum estimating portion from the input signal at the spectrum subtractor, whereby the noise reduction intensity can be automatically adjusted so as to be strong when the estimated signal noise ratio is good or be weak otherwise.

It is to be noted that the above-mentioned noise reduction execution determiner or the reduction intensity calculator may control the switch portion by obtaining a difference between a maximum and a minimum of a frame power value of the input signal as a value equivalent to the signal noise ratio to compare the difference with the threshold value, or by obtaining a cumulative histogram of a frame power value to compare a difference, between frame power values of a specific ratio and of another specific ratio on the cumulative histogram, with the threshold value.

Also, as the frame power value a moving average of the frame power value may be used.

BRIEF DESCRIPTION OF THE DRAWINGS

Throughout the figures, like reference numerals indicate like or corresponding components.

DESCRIPTION OF THE EMBODIMENTS

In order to clarify the present invention in more detail, the present invention will be described referring to the attached figures.

Figure 1:
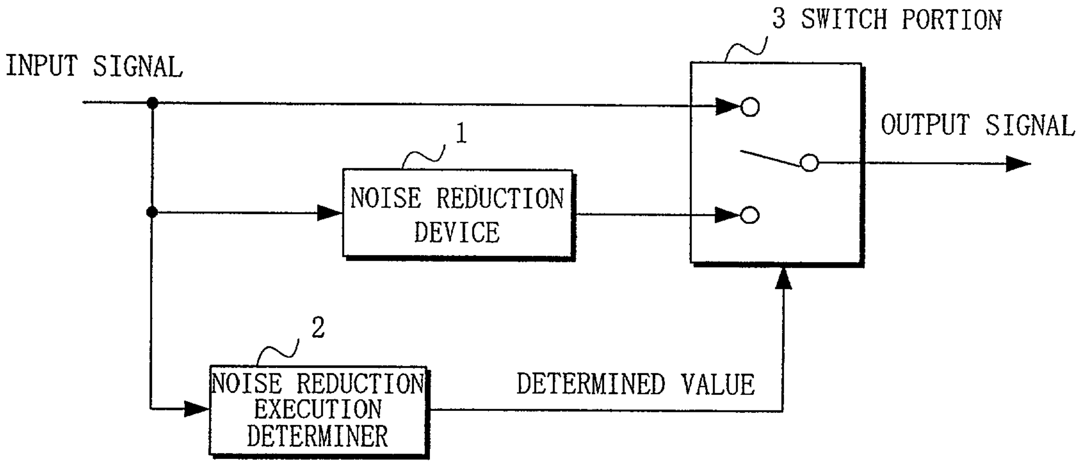
FIG. 1 is a block diagram showing an embodiment (1) of a noise suppressing apparatus according to the present invention.

FIG. 1 shows an embodiment (1) of a noise suppressing apparatus according to the present invention. In this embodiment, the prior art arrangement of the noise reduction device 1 shown in FIG. 6 can be used as it is. Also, a noise reduction execution determiner 2 estimates a signal noise ratio from an input signal, and determines whether or not the estimated value is more than a threshold value. The determined result is provided to a switch portion 3, and only when the estimated signal noise ratio is equal to or more than a threshold value, the switch portion 3 is switched over to the side of the noise reduction device 1, and otherwise outputs the input signal as it is.

Figure 2:
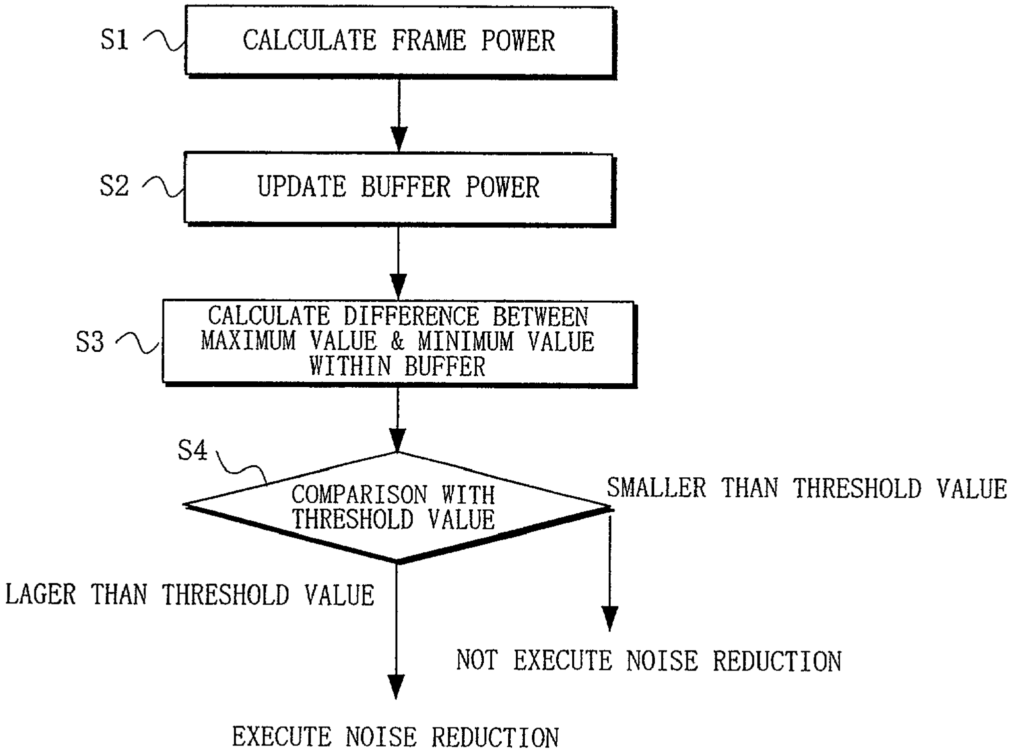
FIG. 2 is a flow chart showing an operation example of the noise reduction execution determiner shown in FIG. 1.

FIG. 2 shows an operation example of the noise reduction execution determiner 2 shown in FIG. 1.

In this noise reduction execution determiner 2, it is supposed that a digital signal processing is performed with the signal being sectioned by a fixed sample. A single section is called a frame and a single frame is supposed to have NF samples. Supposing that 160 samples by 8 kHz sampling form a single frame, a single frame assumes 20 ms.

Firstly, a power nfpow (unit dB) per frame with an input signal being made s1 [ ] will be calculated (at step S1). Supposing that "n" is a variable indicating a sample number, the frame power is expressed by the following equation:

$$nfpow = 10 * \log_{10}\left(\frac{1}{NF}\sum_{n=1}^{NF} s1[n]^2\right) \qquad \text{Eq. (7)}$$

Then, a buffer tbuf [ ] (component number tnum) where past frame power values are accumulated is updated as given by the following equation:

$$\left.\begin{aligned} tbuf[frm] &= tbuf[frm-1] \\ tbuf[1] &= nfpow \end{aligned}\right\} \qquad \text{Eq. (8)}$$

Then, the difference frp_dif between the maximum value and the minimum value within the buffer is obtained by the following equation (at step S3):

$$\text{frp\_dif} = \underset{frm=1}{\overset{tnum}{\text{MAX}}}(tbuf[frm]) - \underset{frm=1}{\overset{tnum}{\text{MIN}}}(tbuf[frm]) \qquad \text{Eq. (9)}$$

The difference frp_dif is compared with the threshold value thr_dp to determine the determined value nr_do as given by the following equation (at step S4):

$$\text{nr\_do} = \begin{cases} 0: \text{ noise reduction stop} & (\text{frp\_dif} < \text{thr\_dp}) \\ 1: \text{ noise reduction execution} & (\text{frp\_dif} \geq \text{thr\_dp}) \end{cases} \qquad \text{Eq. (10)}$$

According to the determined value, the noise reduction execution portion 2 is to switch/control the switch portion 3.

Thus, it should be noticed that while in a pure voice the difference between the powers in the sound presence portion and the sound absence portion is large, a power variation is less and the difference is smaller in many cases of surrounding noise, and that the power difference is small when the signal noise ratio is bad, so that the switch portion 3 is switched over when the estimation of the noise section is difficult as mentioned above and outputs the input signal as it is, thereby stopping the noise reduction.

Figure 3:
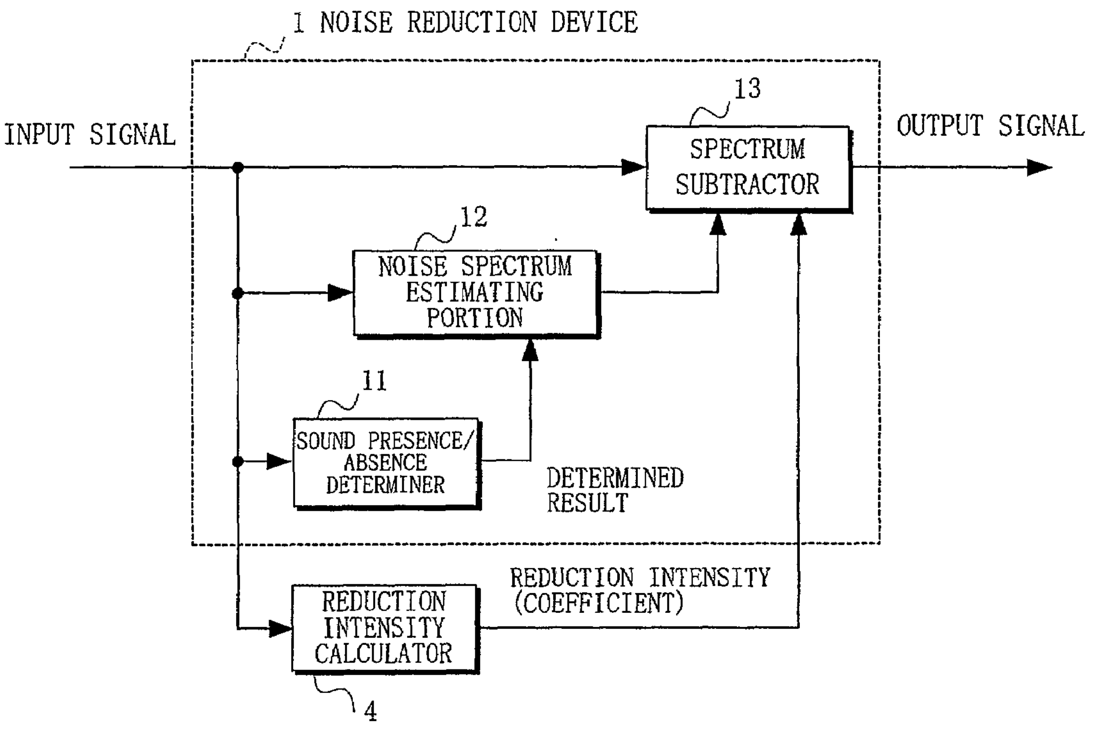
FIG. 3 is a block diagram showing an embodiment (2) of a noise suppressing apparatus according to the present invention.
Figure 6:
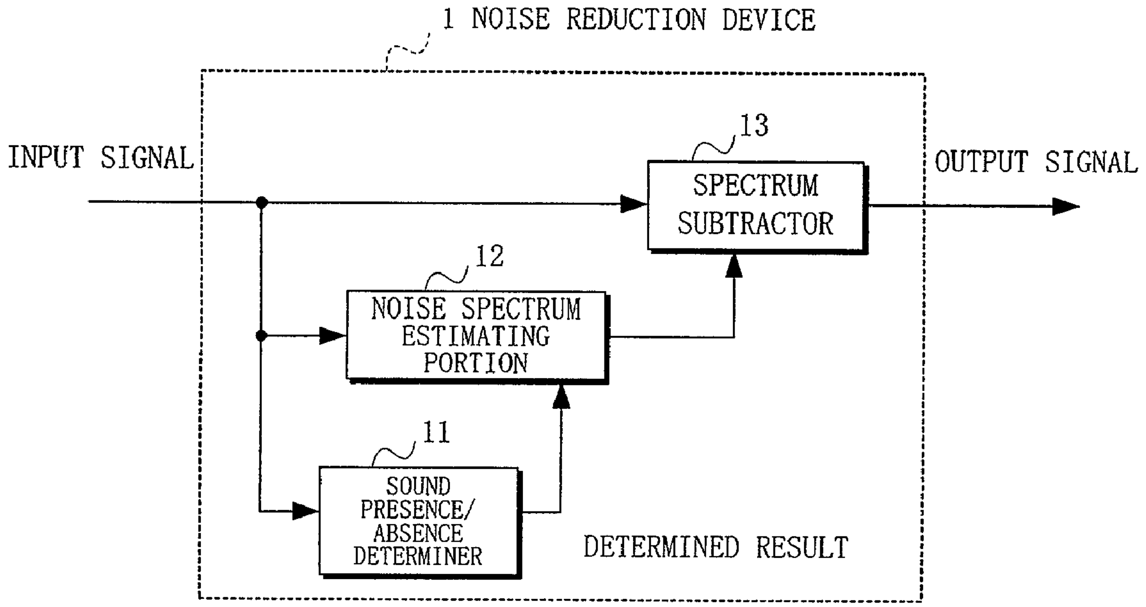
FIG. 6 is a block diagram showing an arrangement of a prior art noise reduction (suppression) device.
Figure 7:
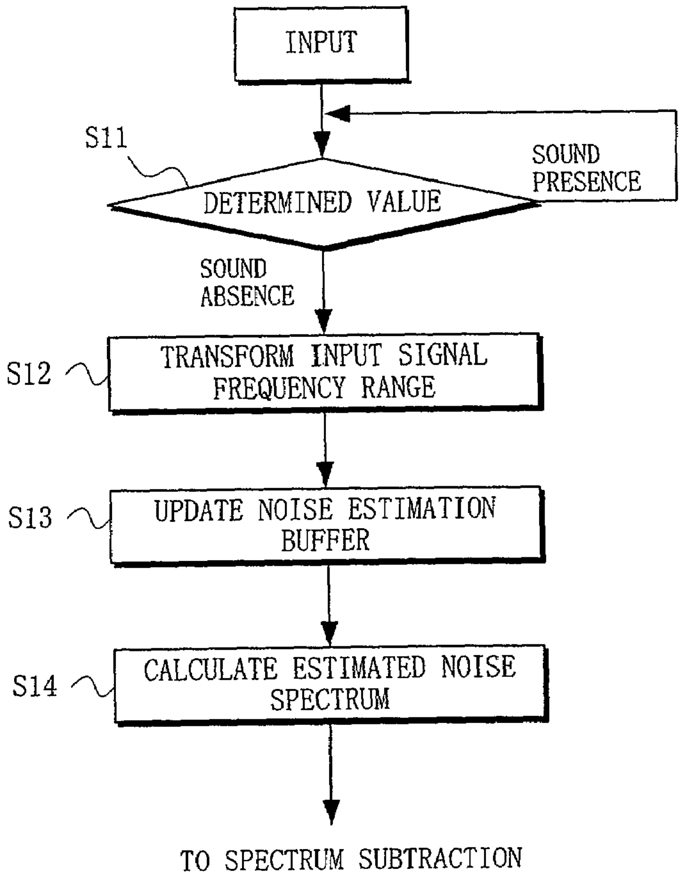
FIG. 7 is a flow chart showing an operation example of the noise spectrum estimating portion shown in FIGS. 3 and 6.

FIG. 3 shows an embodiment (2) of the noise suppressing apparatus according to the present invention. In this embodiment, the noise reduction device 1 shown by dotted lines in FIG. 3 is composed of the sound presence/absence determiner 11, the noise spectrum estimating portion 12, and the spectrum subtractor 13, as shown in FIG. 6. However, it is different from FIG. 6 in that a reduction intensity calculator

4 calculates a reduction intensity (noise multiplier g2) from the input signal to be provided to the spectrum subtractor 13.

Figure 4:
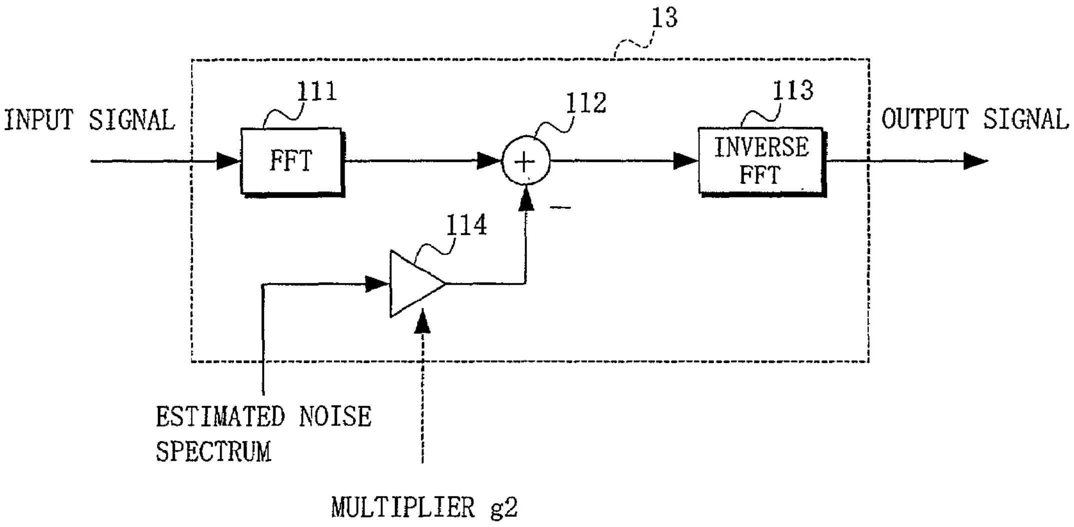
FIG. 4 is a block diagram showing an embodiment of the spectrum subtractor shown in FIG. 3.
Figure 8:
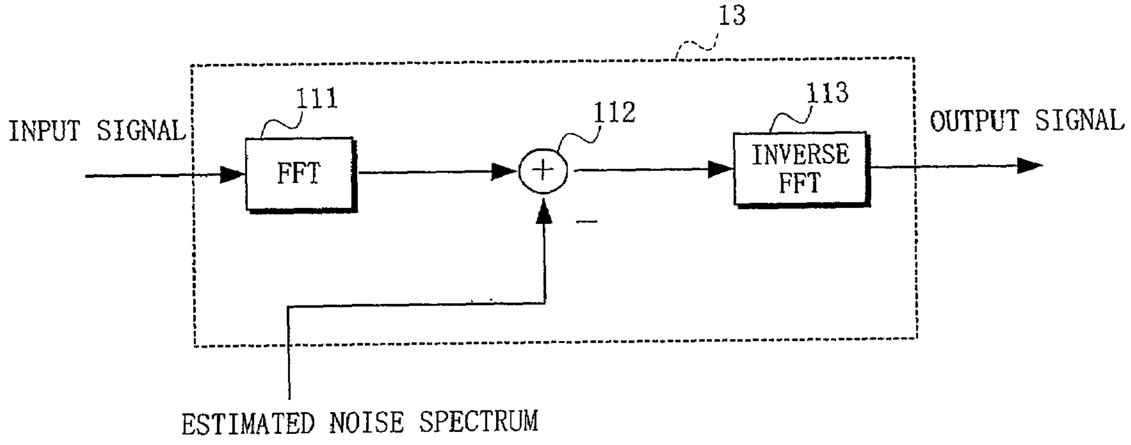
FIG. 8 is a block diagram showing an arrangement of the spectrum subtractor shown in FIG. 6.

The embodiment of the spectrum subtractor 13 is shown in FIG. 4. This embodiment is different from the prior art shown in FIG. 8 in that the estimated noise spectrum from the noise spectrum estimating portion 12 is multiplied by the multiplier g2 at a multiplier 114 to be provided to the subtractor 112.

Hereinafter, the noise multiplier g2 will be described.

Firstly, the noise intensity calculator 4 obtains the frame power nfpow, and updates the buffer tbuf [ ] (component number tnum) where the past frame power values are accumulated as indicated by the above-mentioned Eq.(8).

Then, the buffer is sorted (in descending numeric order) to obtain sortbuf [ ].

Then, the difference frp_dif between the st_top-th power and the st_btm-th power, each from the larger number, is calculated as given by the following equation:

$$frp\_dif = sortbuf[st\_top] - sortbuf[st\_btm] \qquad \text{Eq.(11)}$$

This indicates that e.g. the difference between the 5th power from the top and the 5th power from the bottom is obtained.

It is to be noted that as described in FIG. 2, the power difference frp_dif may be obtained according to Eq.(9). Also, Eq.(11) can be substituted for Eq.(9).

Figure 5:
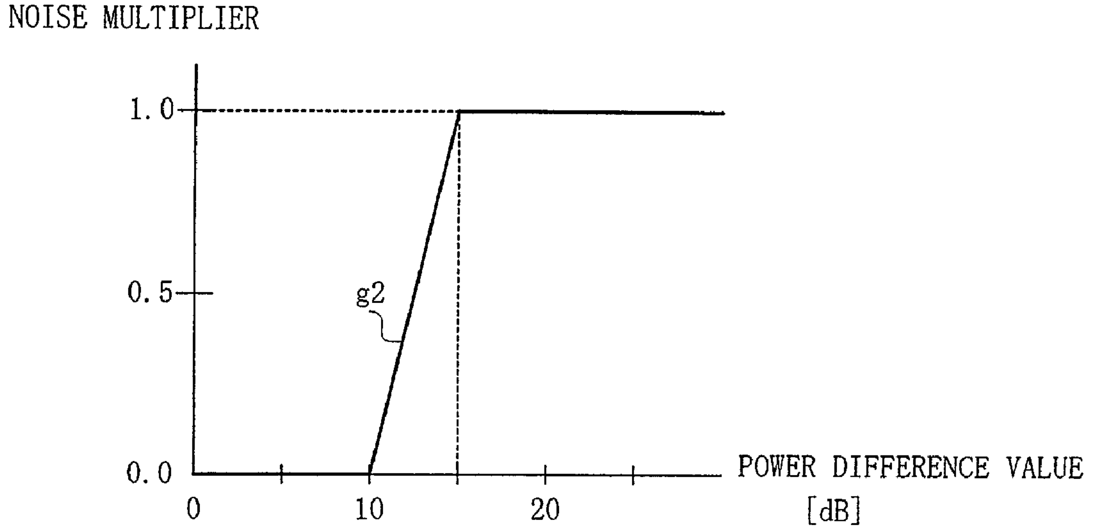
FIG. 5 is a graph showing a function for determining a noise multiplier used for the spectrum subtractor shown in FIG. 4.

From the power difference frp_dif thus obtained, the noise multiplier g2 is determined according to a power difference value-vs-noise multiplier function graph shown in FIG. 5.

Namely, as mentioned above, the power difference value is equivalent to the signal noise ratio. That the power difference value is equal to or less than 10 dB indicates bad estimated signal noise ratio. Therefore, in order to avoid the noise reduction, the multiplier g2 is made "0" to be provided to the multiplier 114, thereby setting the estimated noise spectrum outputted from the noise spectrum estimating portion 12 to "0" to be provided to the subtractor 112. Thus, the input signal is passed through the spectrum subtractor 13 as it is, to be outputted.

Also, when the power difference value is equal to or more than 15 dB, the estimated signal noise ratio is good and the execution of the noise reduction is preferable. Therefore, the multiplier g2 is made "1" to be provided to the multiplier 114, thereby providing the estimated noise spectrum from the noise spectrum estimating portion 12 to the subtractor 112 as it is. Thus, the maximum noise reduction can be performed to the input signal.

Between 10 dB and 15 dB, as shown in the graph of FIG. 5, the noise multiplier g2 is set to proportionally increase from "0" to "1", so that the larger the power difference value becomes, the better the signal noise ratio becomes. Accordingly, if the noise multiplier g2 is enlarged, the estimated noise spectrum passing through the multiplier 114 gradually becomes larger, enabling the noise reduction of the input signal in proportion to the power difference value.

In this case, if a noise reducing coefficient g1 (w) given by the above-mentioned Eq.(5) is obtained by using the noise multiplier g2, the following equation can be obtained:

$$g1[w] = \sqrt{\frac{\text{MAX}(0.0,\ f3[w]*f3[w] - g2*f3est[w]*f3est[w])}{f3[w]*f3[w]}} \qquad \text{Eq. (12)}$$

The real part f4 (w) and the imaginary part f5 (w) of the spectrum after the subtraction are obtained by using the coefficient g1 as given in the above-mentioned Eq.(6), and the inverse FFT calculation is performed at the calculator 113, thereby enabling the signal s2 [ ] after the noise reduction to be obtained.

It is to be noted that a frame power mabuf which is moving-averaged may be used for the frame power difference frp_dif obtained by the above-mentioned Eqs.(9) and (11).

In this case, supposing that the moving average is obtained over a frame number manum, the frame power nfpow is obtained, and the buffer tbuf [ 9 (components number tnum) where the past frame power values are accumulated is updated as given by the above-mentioned Eq.(8).

The moving average is obtained as given by the following equation:

$$mabuf[frm] = \frac{1}{manum} \sum_{k=0}^{manum-1} tbuf[frm+k] \qquad \text{Eq. (13)}$$

Then, the difference frp_dif between the maximum value and the minimum value within the buffer can be obtained by the following equation:

$$\text{frp\_dif} = \underset{frm=1}{\overset{tnum}{\text{MAX}}}(mabuf[frm]) - \underset{frm=1}{\overset{tnum}{\text{MIN}}}(mabuf[frm]) \qquad \text{Eq. (14)}$$

By comparing the difference frp_dif thus obtained with the threshold value thr_dp, the determined value nr_do can be determined as given by Eq.(10).

The noise reduction execution is switched according to the determined value nr_do. When the noise reduction is stopped, the input signal is not processed at all, and when the noise reduction is executed, the estimated noise spectrum subtraction is performed.

As described above, a noise suppressing apparatus according to the present invention is arranged such that a signal noise ratio is estimated from an input signal, and an automatic switch or an automatic adjustment is performed so as to execute a noise reduction only when the signal noise ratio is good, otherwise to avoid the noise reduction or make the noise reduction degree smaller. Therefore, it becomes possible to stop the noise reduction when a noise section is hard to estimate, and to execute a stable noise reduction.

What we claim is:

1. A noise suppressing apparatus comprising:

a noise reduction device for estimating a spectrum of a surrounding noise only when an input signal is soundless and for performing a spectrum subtraction of the input signal based on the estimated noise spectrum;

a noise reduction execution determiner for estimating a signal noise ratio from the input signal and for determining whether or not the signal noise ratio is equal to or more than a threshold value; and a switch portion for selecting an output signal of the noise reduction device based on an output signal of the noise reduction execution determiner only when the signal noise ratio is equal to or more than the threshold value and for selecting the input signal otherwise, wherein the noise reduction execution determiner controls the switch portion by obtaining a difference between a maximum value and a minimum value of a frame power value of the input signal and by comparing the difference with the threshold value.

2. The noise suppressing apparatus as claimed in claim 1 wherein the noise reduction execution determiner calculates as the frame power value a moving average of the frame power value.

3. A noise suppressing apparatus comprising:

a noise reduction device for estimating a spectrum of a surrounding noise only when an input signal is soundless and for performing a spectrum subtraction of the input signal based on the estimated noise spectrum;

a noise reduction execution determiner for estimating a signal noise ratio from the input signal and for determining whether or not the signal noise ratio is equal to or more than a threshold value; and a switch portion for selecting an output signal of the noise reduction device based on an output signal of the noise reduction execution determiner only when the signal noise ratio is equal to or more than the threshold value and for selecting the input signal otherwise, wherein the noise reduction execution determiner controls the switch portion by obtaining a cumulative histogram of a frame power value and by comparing a difference, between frame power values of a specific ratio and of another specific ratio on the cumulative histogram, with the threshold value.

4. The noise suppressing apparatus as claimed in claim 3 wherein the noise reduction execution determiner calculates as the frame power value a moving average of the frame power value.

* * * * *